Dec. 11, 1951 — D. G. FISHER — 2,578,411
FISHING LURE
Filed Feb. 12, 1945
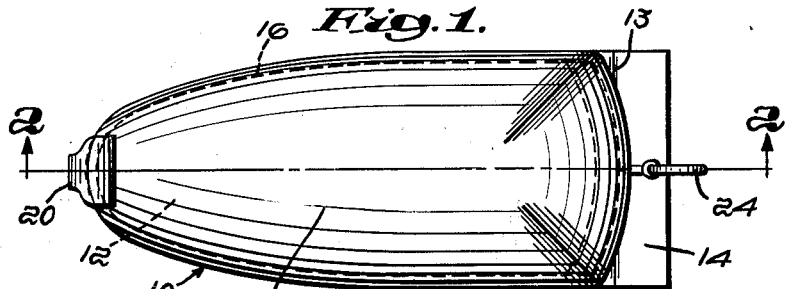
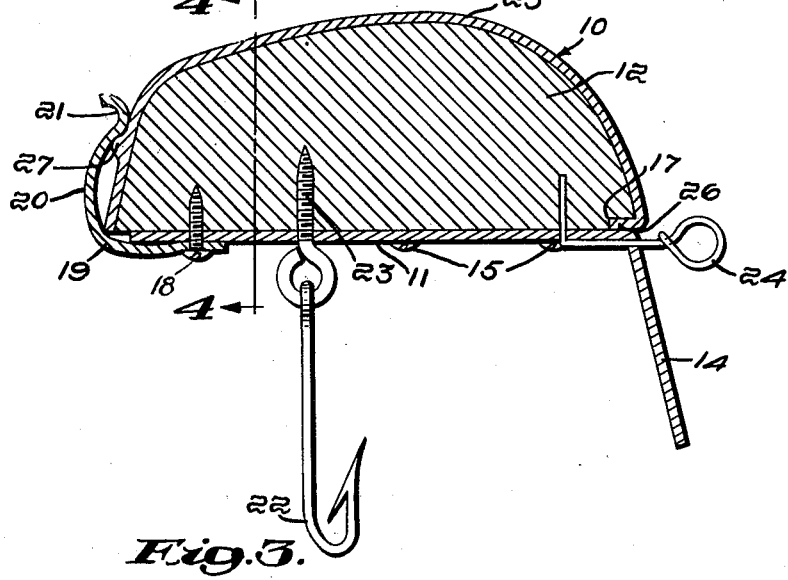
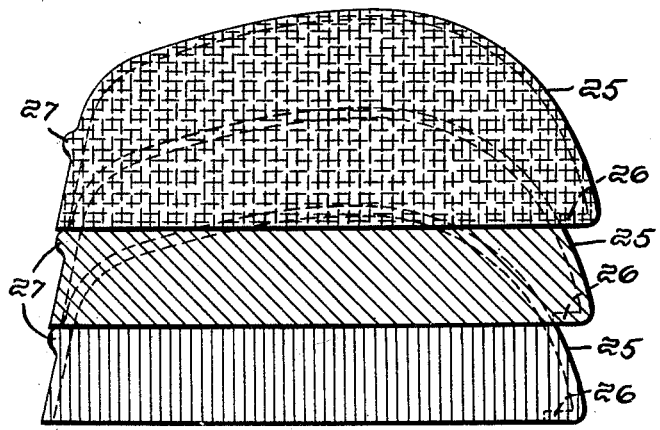
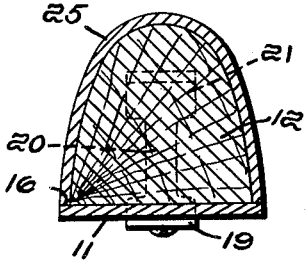
Inventor:
Donald G. Fisher
by Spear & Spear
Attorneys Patented Dec. 11, 1951

2,578,411

UNITED STATES PATENT OFFICE 2,578,411

FISHING LURE

Donald G. Fisher, Petersham, Mass.

Application February 12, 1945, Serial No. 577,533

4 Claims. (Cl. 43—42.09)

My present invention relates to fishing lures and particularly to a lure to which is detachably secured a shell thereby to provide the angler with means for quickly and easily changing the appearance of the lure by attaching a shell of desired appearance or by substituting for one shell, another shell of different appearance.

Lures of the type with which this invention is concerned are primarily adapted for casting, although they may of course be trolled and are commonly termed "plugs". A substantial variety of plugs are available to fishermen. These differ in kind in that their action in the water varies and plugs of the same kind differ in color, finish or the like. The result is that most fishermen have several plugs selected to provide the desired range of lures found most effective in their experience. It is accordingly necessary for them to use tackle boxes which, while not particularly objectionable when fishing from a boat, are a nuisance to those who are wading or fishing from the shore.

In accordance with my invention, I provide a lure comprising a hook carrying body having a pair of spaced locking means and a shell having a pair of locking means to cooperate with the first-named locking means in detachably connecting the shell to the body. By this construction, I make it possible for the angler, quickly and easily to change the appearance of the lure he is using, by attaching a shell to its body, or by utilizing a different shell. As the shells are identical in size and shape, they may be nested to provide a compact pocket kit with which a lure, satisfactory in its action, may be adapted to a wide range of conditions.

In the accompanying drawings, I have shown an illustrative embodiment of my invention from which its novel features and advantages will be readily apparent. In the drawings:

Fig. 1 is a top plan view of a lure in accordance with my invention with a shell attached thereto.

Fig. 2 is a vertical section through the lure of Fig. 1.

Fig. 3 shows a plurality of nested shells, and

Fig. 4 is a section along the lines 4—4, of Fig. 2.

At 10 I have indicated generally a lure which is shown as comprising a flat metal plate 11 of substantially the outline of the base of the lure and an upper portion 12. The front end of the plate 11 is transversely bent as at 13 to establish a downwardly disposed fin 14.

The upper portion 12 of the lure 10 is formed from any suitable stock to establish the desired shape of the lure and may be finished as desired. For such use, wood is admirably adapted particularly when a lure is wanted that will float when at rest or when fished slowly. The upper portion 12 may be attached to the plate 11 in any convenient manner as with screws 15. Preferably the lower part of the body portion 12 is slightly smaller than the plate 11 so that the plate 11 is marginally exposed to establish a shoulder 16. At its front end, the body portion 12 is undercut to define with the plate 11, a recess 17.

Attached to the plate 11 as by a screw 18 is a resilient latch 19 preferably formed from relatively thin stock reversely bent to establish a rearwardly projecting bow 20 and a latching portion 21 engaging one portion of the lure adjacent its rear end. Preferably the latch 19 in its zone defined by the bow 20 is narrower than in the zone defined by the latching portion 21. By this construction, a piece of pork rind or other lure may be slipped over the latching portion 21 and turned into trailing position in the bow portion 20.

At 22, I have indicated a hook attached by a screw 23 extending through the plate 11 into the body portion 12. At 24 I have shown an eye member, which may be attached to the lure in any desired way as by extending it through the fin 14, the plate 11 and into the body portion 12.

By this construction, I provide a lure combining ease of manufacture with an excellent action that varies with the speed at which it is fished. When the body portion 12 is made of wood or other floating material, my lure floats when at rest or when fished slowly and which submerges when fished rapidly and has at all times an action which has proved effective.

At 25 I have shown a plastic shell preferably shaped to receive within it the body portion 12 when seated on the shoulder 16. The shell 25 has an inwardly disposed lip 26 at its front end to enter the recess 17 and at its rear end it has a projection 27 to be engaged by the latch 19 to detachably anchor the shell 25 to the body.

As shown in Fig. 3, shells 25 are adapted to nest within each other thereby to permit a plurality of them to be compactly carried. As I have indicated in Fig. 3, the shells 25 may be differently colored or they may be otherwise made so that when used they alter the appearance of the lure.

It will thus be apparent that my invention provides not only a lure which by itself is extremely effective in use but also means for quickly and easily changing its appearance so that an angler may have a complete and compact kit to meet a wide range of conditions.

What I therefore claim and desire to secure by Letters Patent is:

1. A fishing lure comprising a body including first and second interconnected portions, said first portion being a metal plate of substantially the outline of the bottom of said body and including a downwardly disposed fin at the front end of said body, and said second portion being shaped to establish the desired shape of said lure and being of such size that said first portion establishes a marginal shoulder, and a shell to receive within it said second portion and to seat on said shoulder, and means to detachably lock said shell to said body.

2. The fishing lure of claim 1, in which the locking means includes an upwardly and inwardly extending latch on said first body portion and engageable with the rear of the lure, said latch comprising a latching portion and an intermediate, rearwardly disposed bow, the bow being of less width than the latching portion.

3. A fishing lure comprising a hook carrying body having at its bottom edge a flange extending laterally from opposite sides thereof and having a recess in its front end adjacent said bottom edge, a resilient latch at the rear of said body extending forwardly and upwardly to engage with said lure a substantial distance above said bottom edge, line attaching means connected to said body, and a shell of substantially the size and shape of said body and being of such a size that it may fit over said body and engage with said flange, said shell including at its front end an inwardly disposed lip to enter said recess and at its rear end a detent surface engageable by said latch as said shell is seated on said flange.

4. A fishing lure comprising a hook carrying body member including line attaching means and having at its bottom edge a shoulder extending laterally from opposite sides thereof, a shell member of such size and shape that it may fit over said body member and engage with said shoulder, and complemental pairs of means at opposite ends of said body member detachably locking said shell member to said body member, one pair of means consisting of a resilient latch on one of said members and a detent surface on the other of said members and the other pair of means consisting of a protruding portion on one of said members and a recess in the other member to receive said portion.

DONALD G. FISHER.

REFERENCES CITED

The following references are of record in the file of this patent:

UNITED STATES PATENTS

| Number | Name | Date |
|---|---|---|
| 621,032 | Chalmers | Mar. 14, 1899 |
| 1,207,588 | Maus | Dec. 5, 1916 |
| 1,466,545 | Peterson | Aug. 28, 1923 |
| 1,599,763 | Head | Sept. 14, 1926 |
| 1,600,652 | Steenstrup | Sept. 21, 1926 |
| 1,600,653 | Steenstrup | Sept. 21, 1926 |
| 1,671,547 | Rothera | May 29, 1928 |